United States Patent
Bansal et al.

(10) Patent No.: US 6,650,637 B1
(45) Date of Patent: Nov. 18, 2003

(54) MULTI-PORT RAM BASED CROSS-CONNECT SYSTEM

(75) Inventors: Narendra K. Bansal, Mount Prospect, IL (US); Kenneth A. Becker, Middlesex County, NJ (US); James S. Lavranchuk, Hillsborough, NJ (US)

(73) Assignee: Lucent Technologies Inc., Murray Hill, NJ (US)

( * ) Notice: Subject to any disclaimer, the term of this patent is extended or adjusted under 35 U.S.C. 154(b) by 0 days.

(21) Appl. No.: 09/211,497

(22) Filed: Dec. 14, 1998

(51) Int. Cl.$^7$ .............................................. H04L 12/50
(52) U.S. Cl. ........................ 370/360; 370/359; 370/378
(58) Field of Search ................................ 370/360, 366, 370/368, 369, 371, 370, 375, 376, 378, 379, 358, 359

(56) References Cited

U.S. PATENT DOCUMENTS

| | | | | |
|---|---|---|---|---|
| 4,967,405 A | | 10/1990 | Upp et al. ...................... 370/1 |
| 5,040,170 A | | 8/1991 | Upp et al. .................. 359/135 |
| 5,128,929 A | * | 7/1992 | Kobayashi ................. 370/58.1 |
| 5,570,358 A | * | 10/1996 | Alatalo et al. ............. 370/58.2 |
| 5,590,129 A | | 12/1996 | Ardon ........................ 370/376 |
| 5,710,770 A | * | 1/1998 | Kozaki et al. .............. 370/368 |
| 5,781,527 A | | 7/1998 | Read et al. .................. 370/216 |
| 5,903,560 A | * | 5/1999 | Samejima et al. .......... 370/378 |

FOREIGN PATENT DOCUMENTS

CA  2235440  10/1998

OTHER PUBLICATIONS

Canadian Intellectual Property Office—Office Vction Dated Dec. 27, 2001, 2pages (corresponding Canadian Application 2,287.763).

* cited by examiner

Primary Examiner—Alpus H. Hsu
Assistant Examiner—Thien D Tran

(57) ABSTRACT

A high capacity digital non-blocking cross-connect switching fabric is realized by employing a multi-port RAM based space-time switch having a plurality of write circuits and a plurality of read circuits, each of which operates at a timing rate that is a prescribed fraction of the input/output clock rate of the input/output ports of the multi-port RAM based cross-connect switching fabric. The at least one multi-port RAM switch unit has a plurality of write circuits and a plurality of read circuits, each of which operates at a timing rate that is a prescribed fraction of the input/output clock rate of the input/output ports of the multi-port RAM based cross-connect switching fabric. Additionally, in one embodiment, each of the write circuits and each of the read circuits has independent and unrestricted access to all data storage positions in each of a plurality of storage units that make up the at least one multi-port RAM switch unit. Because the write circuits and each of the read circuits are operating at the prescribed fraction of the multi-port RAM switch unit input/output clock rate, a multi-port RAM based cross-connect switching fabric is realizable which has a significantly larger storage capacity that is accessible within a reasonable access time. In one embodiment of the invention, a plurality of multi-port RAM switch units is employed to realize a multi-port RAM based non-blocking cross-connect switching fabric. In a specific embodiment, the fractional write rate is exploited so that a plurality of input ports can be served by a single write circuit. In another embodiment, each write circuit is assigned exclusive access to a particular segment of the write address space that is different from that assigned to any other write circuit. Furthermore, since the read circuits are operating at a fraction of the output port clock rate, each of the read circuits can serve a plurality of output ports by delivering read signal elements from the multi-port RAM switch unit to the output ports in a round robin fashion. Additionally, in another embodiment of the invention, each read circuit is assigned exclusive access to a particular segment of the read address space that is different from that assigned to any other read circuit. Consequently, the capacity of the multi-port RAM based cross-connect switching fabric is markedly increased.

12 Claims, 4 Drawing Sheets

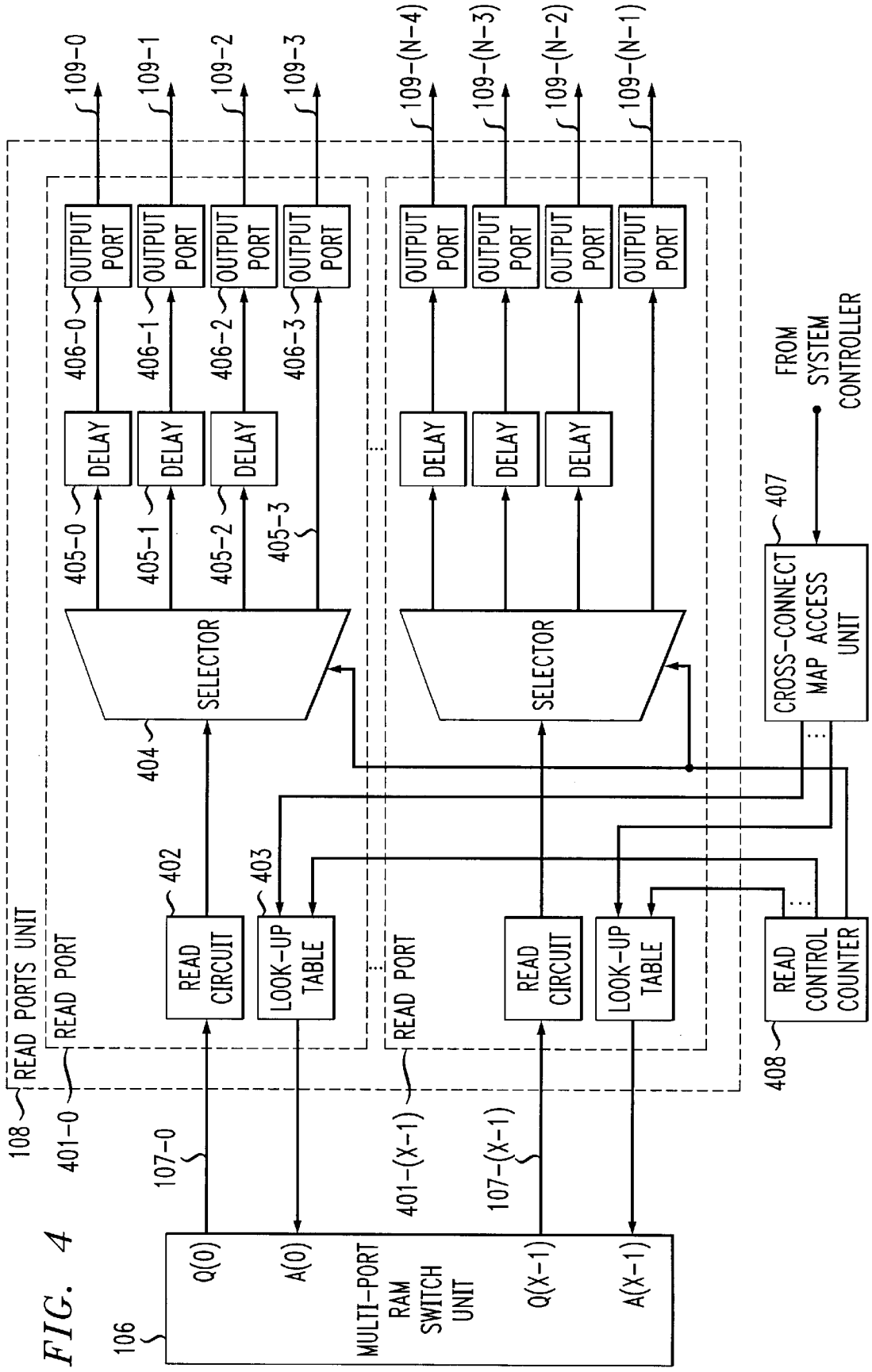

MULTI-PORT RAM BASED CROSS-CONNECT SYSTEM

TECHNICAL FIELD

This invention relates to cross-connect systems and, more particularly, to large time/space switch fabrics.

BACKGROUND OF THE INVENTION

Digital cross-connect systems are commonly employed to controllably rearrange and redirect the contents of signals being communicated in digital transmission systems. However, with ever increasing demands for larger transmission capacity, there is a need for increasingly larger capacity non-blocking switch units used in the cross-connect switching fabric.

There are several known approaches that may be employed to realize cross-connect switching fabrics. One such approach employs an array of n:1 multiplexors, where "n" is the capacity of the cross-connect switching fabric. Unfortunately, the size of such multiplexor arrays grows exponentially with "n" and each of the inputs of the array suffers a load that grows linearly with "n".

In another prior known approach, inputs are time multiplexed and, then, stored in an array of storage elements, typically a random access memory (RAM) unit. The RAM unit size is twice the number of signal elements to be switched, i.e., cross-connected, so that an entire complement of input signal elements can be read by out ports in an arbitrary order, while a new complement is being simultaneously being stored. As the capacity of the switching fabric increases, the number of different signal elements arriving per unit of time increases, and the size of the RAM unit and the speed of its write and read ports must also increase.

Moreover, in such arrangements, the size of the signal elements affects the size of the RAM unit and the access cycle time. In order to minimize the through put delay of the switching fabric, it is necessary to reduce the size of the signal elements which, in turn, increases the frequency at which elements from each signal must be accessed to maintain the cross-connected signals. Indeed, it is desirable to access an entire signal during a write or read cycle. Clearly, in this arrangement, the cross connect write/read port capacity becomes a bottleneck thereby limiting the size of such RAM based cross-connect systems.

Indeed, the size of available RAM units and their access time limit the capacity of known cross-connect switching fabrics. As indicated above, as the size of the RAM units increases, the access time of the RAM units also increases. Consequently, there is a fundamental limitation of the capacity of prior known cross-connect switching fabrics employing RAM units. Additionally, the access time of the RAM units is dominated primarily by the need for write address decoding, read address decoding or both to provide unrestricted access to the stored contents of the entire RAM. As the size of the RAM increases, the number of address decoding stages, select lines and inputs for each of a plurality of so-called sense amplifiers increases which, in turn, slows down each phase of the data access operation of the cross-connect switching fabric.

SUMMARY OF THE INVENTION

These and other problems and limitations of prior known digital cross-connect switching fabrics are overcome by employing at least one multi-port RAM switch unit to realize a non-blocking cross-connect space-time switching fabric. The at least one multi-port RAM switch unit has a plurality of write circuits and a plurality of read circuits, each of which operates at a timing rate that is a prescribed fraction of the input/output clock rate of the input/output ports of the multi-port RAM based cross-connect switching fabric. Additionally, in one embodiment, each of the write circuits only needs partial access to non-overlapping storage positions and each of the read circuits has independent and unrestricted access to all data storage positions in each of a plurality of storage units that make up the at least one multi-port RAM switch unit. Because the write circuits and each of the read circuits are operating at the prescribed fraction of the multi-port RAM switch unit input/output clock rate, a multi-port RAM based cross-connect switching fabric is realizable which has a significantly larger storage capacity that is accessible within a reasonable access time.

In one embodiment of the invention, a plurality of multi-port RAM switch units is employed to realize a multi-port RAM based non-blocking cross-connect switching fabric.

In a specific embodiment, the fractional write rate is exploited so that a single write circuit can serve a plurality of input ports. In this manner incoming signal elements that were arrayed in space are converted to signal elements arrayed in time. Moreover, the space diversity of the incoming signal elements is further exploited by employing a plurality of write circuits each of which has access to a common write address space. Specifically, each write circuit is assigned exclusive access to a particular segment of the write address space that is different from that assigned to any other write circuit. The signal elements that are supplied through a particular write circuit are written into the segment of memory locations of the multi-port RAM switch unit assigned to that particular write circuit. When the write address space is completely full, the entire capacity of the input ports is collected in a single memory address space in a predetermined order. Then, this write address space becomes the read address space, while the former read address space now becomes the write address space to be employed while writing newly arriving input signal elements.

Furthermore, since the read circuits are operating at a fraction of the output port clock rate, each of the read circuits can serve a plurality of output ports by delivering read signal elements from the multi-port RAM switch unit to the output ports in a round robin fashion. Additionally, in another embodiment of the invention, each read circuit is assigned exclusive access to a particular segment of the read address space that is different from that assigned to any other read circuit.

Consequently, the capacity of the multi-port RAM based cross-connect switching fabric is markedly increased. Employing separate write input ports and read output ports doubles the cross-connect capacity of the multi-port RAM switch unit. The addition of a second write input port and read output port pair further doubles the cross-connect capacity of the multi-port RAM switch unit. Adding further write input port and read output port pairs proportionately increases the cross-connect capacity of the multi-port RAM switch unit in a linear fashion.

BRIEF DESCRIPTION OF THE DRAWING

FIG. 4 shows, in simplified block diagram form, details of a read ports unit including an embodiment of the invention that may be employed in the embodiment of FIG. 1.

DETAILED DESCRIPTION

Figure 1:
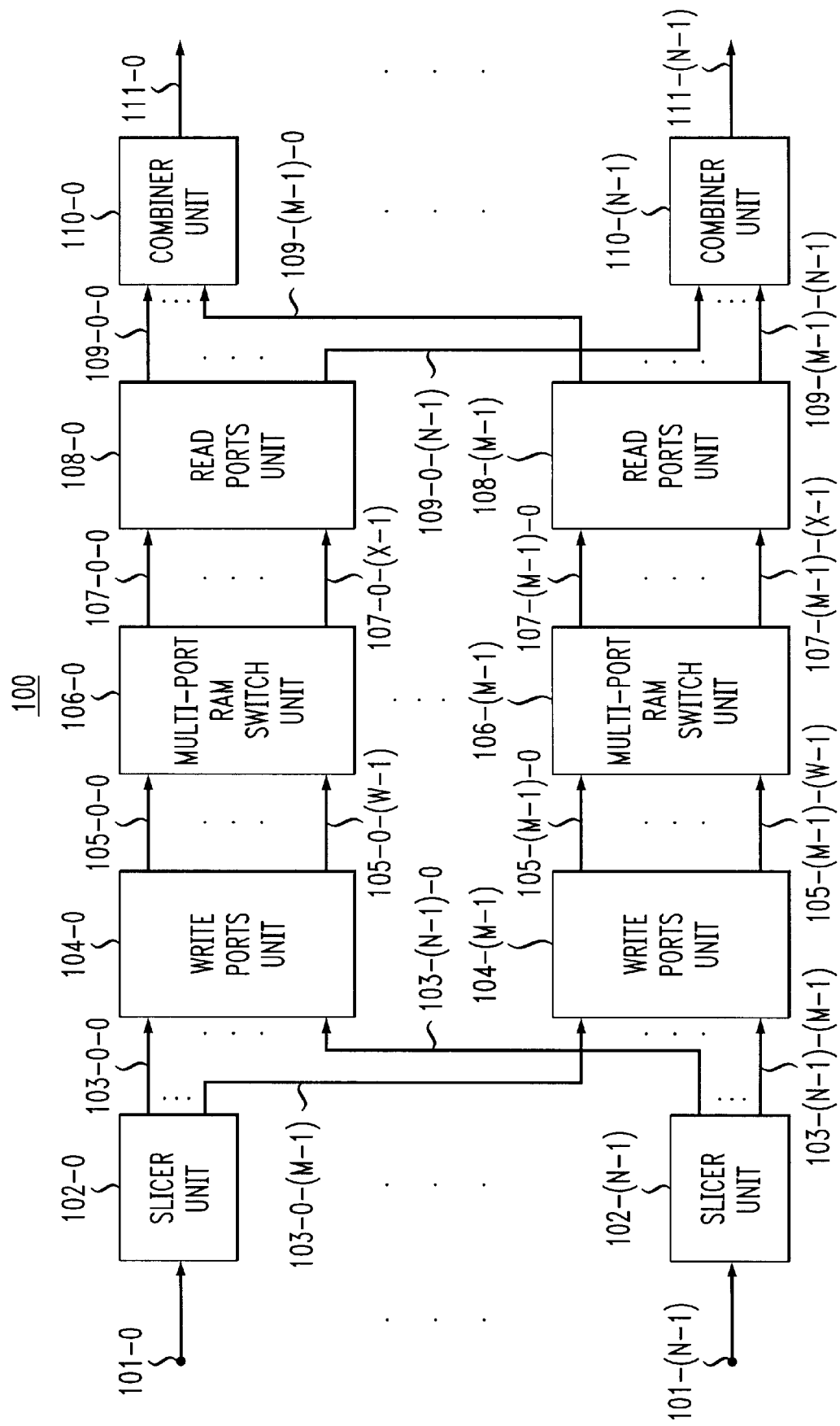
FIG. 1 shows, in simplified block diagram form, details of a multi-port Ram based cross-connect switching fabric including an embodiment of the invention.

FIG. 1 shows, in simplified block diagram form, details of a multi-port Ram based cross-connect switching fabric 100 including an embodiment of the invention. It is noted that each of the multi-port RAM switch units 106 is so-called doubled buffered so that one of the buffers is being read while the other one is being written during a memory cycle and vice versa. Additionally, for simplicity and clarity of exposition only the service portion of the cross-connect switching fabric is being described. A protection portion that is substantially identical to the service portion is not described, but will be apparent to those skilled in the art from the following description of the service portion of the cross-connect switching fabric.

Specifically, incoming signals are supplied to inputs 101-0 through 101-(N−1) of non-blocking cross-connect 100. In this example, incoming signals to each of inputs 101 include 8 so-call TXI-12 links. A TXI-12 signal (622.08 MHz) includes 12 so-called TXI-1 signals (51.84 MHz), and is substantially similar to a SONET STS-12 signal, which is made up of 12 STS-1 SONET signals multiplexed together. Thus, each input 101 receives 96 so-called TXI-1 signals, which are substantially similar to 96 STS-1 signals. The 96 TXI-1 signals received on each of inputs 101-0 through 101-(N−1) are supplied to slicer units 102-0 through 102-(N−1), respectively. In each slicer unit 102, the received signals are applied to pointer processors (not shown) which are well known in the SONET art. The pointer processor compensates for propagation delay through the cross-connect and realigns transport overhead of the received TXI-12 signals to compensate for variations in the distance between the slicer units 102 and the multi-port RAM switches 106. The pointer processor output in each slicer unit 102 is supplied to a slicer (not shown). Each of the slicer units buffers the 96 TXI-1 signals and supplies as an output 32 so-called SXI-3 signals (155.52 MHz), each of which has 96 8-bit time slots.

The SXI-3 format is as follows: during the first time slot 32 bytes of a first of the TXI-1 signals are supplied as an output; during the second time slot 32 bytes of the second TXI-1 signal are supplied as an output; and so on until 32 bytes of the 96th TXI-1 signal are supplied as an output. Then, the process is iterated. In this example, the TXI-1 signals are being cross-connected via cross-connect switching fabric 100.

Figure 2:
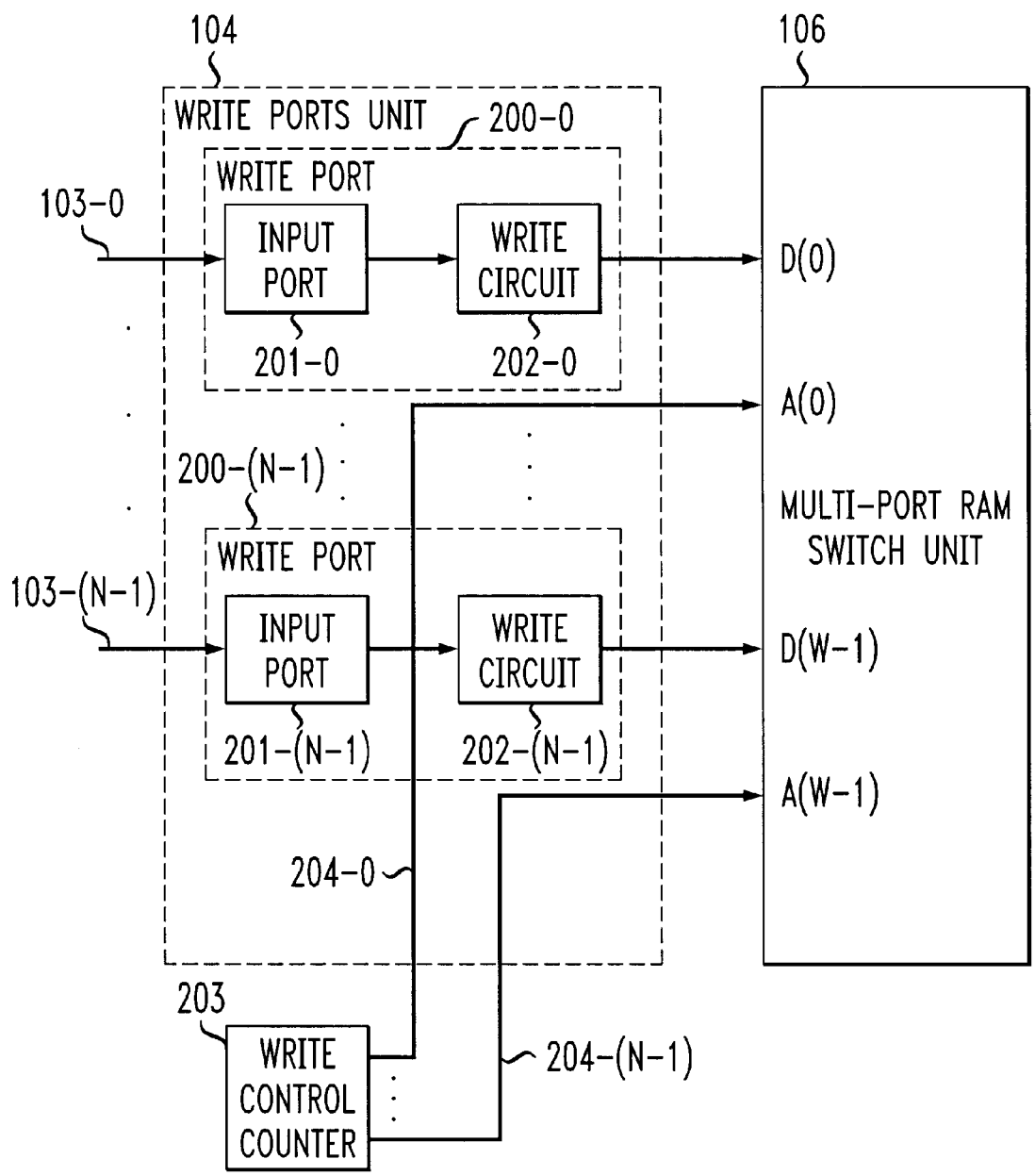
FIG. 2 shows, in simplified block diagram form, details of a write ports unit that can be employed in the embodiment of FIG. 1.
Figure 3:
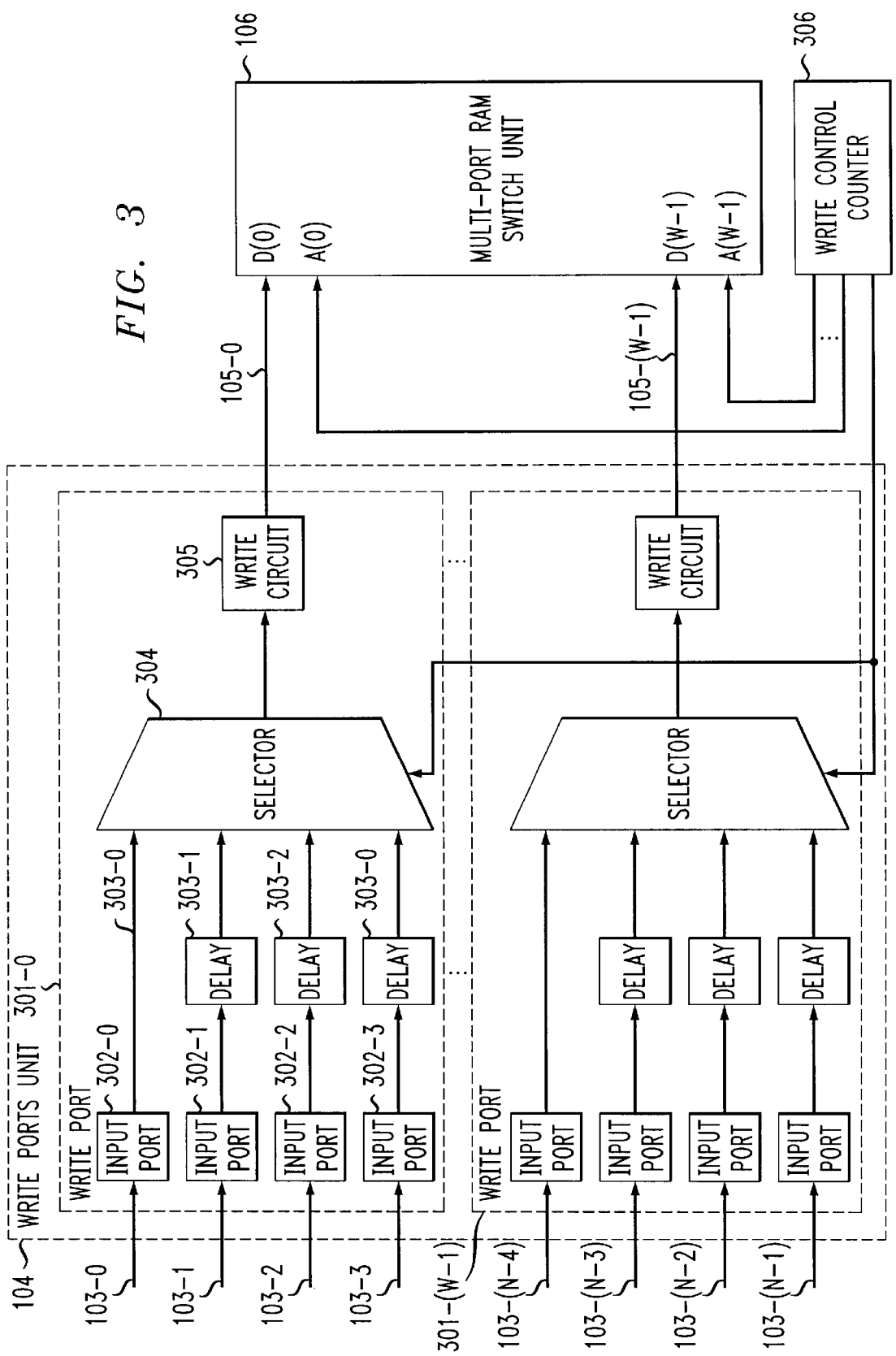
FIG. 3 shows, in simplified block diagram form, details of another write ports unit employing an embodiment of the invention that can be employed in the embodiment of FIG. 1.

The SXI-3 formatted signals are supplied from slicer unit 102-0 outputs via links 103-0-0 through 103-0-(M−1), through slicer unit 102-(N−1) outputs via links 103-(N−1)-0 through 103-(N−1)-(M−1) to specific inputs of write ports units 104-0 through 104-(M−1) as follows: all the slice "0" SXI-3 outputs from slicer units 102-0 through 102-(N−1) are supplied to inputs of write ports unit 104-0; all the slice "1" SXI-3 outputs from slicer units 102-0 through 102-(N−1) are supplied to inputs of write ports unit 104-1, and so on until; all the slice "(M−1)" SXI-3 outputs from slicer units 102-0 through 102-(N−1) are supplied to write ports unit 104-(M−1). (Note that in this example, N=48 and M=32.) Details of write ports units 104 which may be employed in the embodiment of the invention shown in FIG.1 are illustrated in FIG. 2 and FIG. 3 and described below. In this example, in FIG. 2 each of write ports units 104 has W=48 outputs (output rate of 8-bits at 19.44 MHz), and in FIG.3 each of write ports units 104 has W=12 outputs (output rate of 8-bits at 77.76 MHz). Thus, when the write ports unit of FIG. 2 or FIG. 3 is being employed for write ports units 104, the outputs of write ports unit 104-0 are supplied via links 105-0-0 through 105-0-(W−1), where W=48 or W=12, respectively, to a corresponding number of inputs of multi-port RAM switch unit 106-0, through the outputs of write ports unit 104-(M−1) being supplied via links 105-(M−1)-0 through 105-(M−1)-(W−1) to a corresponding number of inputs of multi-port RAM switch unit 106-(M−1), respectively. Note, in this example, that when W=48 each of the inputs to each of multi-port RAM switch units 106 is at a first clock rate of 19.44 MHz and that when W=12 each of the inputs to each of multi-port RAM switch units 106 is at the first clock rate of 77.76 MHz. Note that the first clock rate is slower than the input/output clock rate of multi-port RAM switch units 106.

Operation of each of write ports units 104 is to write 8-bit slices out of 96 slices sequentially into memory locations of a corresponding one of multi-port RAM switch units 106.

Outputs from multi-port RAM switch unit 106-0 are supplied via links 107-0-0 through 107-0-(X−1) to a corresponding number of inputs of read ports unit 108-0, through outputs from multi-port RAM switch unit 106-(M−1) being supplied via links 107-(M−1)-0 through 107-(M−1)-(X−1) to a corresponding number of inputs of read ports unit 108-(M−1), respectively. (In this example, X=12 and M=32 and the output rate of multi-port switch units 106 is 77.76 MHz which is the read clock rate, i.e., the second clock rate. The second clock rate is also slower than the input/output clock rate of multi-port RAM switch units 106.)

It should be noted that the importance of applicants unique employment of multi-port RAM switch units 106 is to increase the cross-connection capacity while maintaining a reasonable switch access time. To this end, applicants advantageously have utilized the characteristics of multi-port Ram units to realize this, namely, that by separating a typical single write/read Ram port into a separate write input port and a separate read output port doubles the cross-connect capacity of the RAM, adding a second write input port and read output port pair again doubles the cross-connect capacity of the RAM and the further addition of write input port and read output port pairs proportionately further increases the cross-connect capacity of the RAM in a linear fashion.

In this example, operation of each of read ports units 108 is such as to controllably read 8-bit slices out of 4608 slices in response to an input slice-to-output slice map supplied from the cross-connect system controller and associated on a one-to-one basis with each of read ports units 108. The 8-bit slices being read are supplied as outputs of read ports units 108. Specifically, the outputs from read ports units 108 are as follows: read ports unit 108-0 supplies outputs via links 109-0 through 109-0-(N−1) to the slice "0" inputs of combiner units 110-0 though 110-(N−1), respectively; read ports unit 108-1 supplies outputs via links 109-0-1 through 109-(M−1)-(N−1) to the slice "1" inputs of combiner units 110-0 through 110-(N−1), respectively, and so on; through read ports unit 108-(M−1) supplying outputs via links 109-(M−1)-0 through 109-(M−1)-(N−1) to the slice "(M−1)" inputs of combiner units 110-0 through 110-(N−1), respectively. (Again, in this example N=48, M=32 and the output rate of read ports units 108 is 155.52 MHz.) Details of read ports units 108 are shown in FIG. 3 and described below.

Each of combiner units 110 operates to reassemble the cross-connected TXI-1 signals and to supply them in groups of 12, i.e., as TXI-12 signals, as outputs at 622.08 MHz. In this example, each of combiner units 110-0 through 110-(N−1) supplies TXI-12 signals as outputs via 8 links forming outputs 111-0 through 111-(N−1), respectively. (Again, in this example, N=48.)

Operation of each of multi-port RAM switch units 106 in conjunction with its corresponding write ports unit 104 and read ports unit 108 is to perform a space-time switch and is such that any incoming 8-bit slice out of 96 slices on any input or the equivalent thereof can be cross-connected to any 8-bit slice out of 96 slices on any output or equivalent thereof. Thus, in this example, in each of multi-port RAM switch units 106 this, in conjunction with its corresponding write ports unit 104 and read ports unit 108, results in a 4608×4608 by 8-bit multi-port switch unit and the entire matrix of the M=32 multi-port RAM switch units 106 forms the multi-port RAM based cross-connect switching fabric for cross-connecting the TXI-1 signals.

FIG. 2 shows, in simplified block diagram form, details of write ports unit 104 that can be employed in the embodiment of FIG. 1. Specifically, each of write ports units 104 includes a plurality of write ports 200-0 through 200-(N−1) to which inputs 103-0 through 103-(N−1), respectively, are supplied. Each of write ports 200 includes a write input port 201 and a write circuit 201. Signal elements are written in a predetermined sequence to inputs D(0) through D(W−1) of multi-port RAM switch unit 106, and therein to memory locations, from write circuits 202-0 through 202-(N−1), respectively, under control of write control counter 203. Write control counter 203 supplies appropriate clock signal to address inputs A(0) through A(W−1), which correspond on a one-to-one basis to inputs D(0) through D(W−1), respectively. (In this example N=48, W=48, the input rate is 1-bit at 155.52 MHz and the write rate is 8-bits at 19.44 MHz.)

FIG. 3 shows, in simplified block diagram form, details of another write ports unit 104 employing an embodiment of the invention that can also be employed in the embodiment of FIG. 1. Specifically, each of write ports units 104 includes a plurality of write ports 301-0 through 301-(W−1) which are identical. In this example, write port 301-0 is described and includes four (4) input ports 302-0 through 302-3 to which incoming 8-bit slices are supplied via inputs 103-0 through 103-3 at a rate of 1-bit at 155.52 MHz.

Each of write input ports 302-0 through 302-3 supplies an output at a rate of 8-bits at 19.44 MHz in a time staggered repetitive sequence to inputs of selector 304. To this end, an output from write input port 302-0 is supplied via 303-0 with no delay to an input of selector 304. An output from write input port 302-1 is supplied via delay unit 303-1 to an input of selector 304. Delay unit 303-1 delays the supplied signal by one (1) delay interval unit. An output from write input port 302-2 is supplied via delay unit 303-2 to an input of selector 304. Delay unit 303-2 delays the supplied signal by two (2) delay interval units. An output from write input port 302-3 is supplied via delay unit 303-3 to an input of controllable selector 304. Delay unit 303-3 delays the supplied signal by three (3) delay interval units. In turn, controllable selector 304, is a controllable element under control of write control counter 306 and supplies signal elements in a repetitive sequence from 303-0 and delay units 303-2 through 303-3 to write circuit 305. Then, the signal elements are written in the repetitive sequence, i.e., in a round-robin fashion, into predetermined storage locations in a corresponding one of multi-port RAM switch units 106 under control of write control counter 306, in well known fashion. Thus, signal elements from write ports 301-0 through 301-(W−1) are written into inputs D(0) through D(W−1), respectively, under control of address signals supplied to address inputs A(0) through A(W−1), respectively, of the corresponding one of multi-port RAM switch units 106. (In this example, W=12 and the input rate of write ports 301 is 1-bit at 155.52 MHz and the write rate is 8-bits at 77.76 MHz.) By reducing the number of write ports we can reduce the size of the multi-port memory component. As previously stated, a smaller memory component can maintain a higher red/write rate, or can be made deeper for the same read/write rate.

FIG. 4 shows, in simplified block diagram form, details of one of read ports units 108 including an embodiment of the invention that may be employed in the embodiment of FIG. 1. Specifically, each of read ports units 108 includes a plurality of read ports 401-0 through 401-(X−1) which are identical, and into which signal elements are read from memory locations of a corresponding one of multi-port RAM switch units 106 via outputs Q(0) through Q(X−1) into read ports 401-0 through 401-(X−1) under control of addresses supplied to address inputs A(0) through A(X−1), respectively. In this example, read port 401-0 is described and includes read circuit 402 which has access to memory locations identified by a predetermined segment of the read address space assigned to read port 401-0 and contained in look-up table 403. The addresses stored in look-up table 403 are supplied via cross-connect map access unit 407 from a system controller and are supplied under control of read control counter 408 to address input A(0) of the corresponding one of multi-port switch units 106. Signal elements are supplied from output Q(0) of a corresponding one of multi-port RAM switch units 106 to read port 401-0, and therein read circuit 402, in a corresponding one of read ports units 108 under control of addresses stored in look-up table 403. Signal elements are supplied from read circuit 402 in an arbitrary order to controllable selector 404 as determined by the address map segment in look-up table 403. Controllable selector 404, is a controllable element under control of read control counter 108 and supplies the read signal elements, i.e., slices, in a repetitive sequence, i.e., in a round robin fashion, via delay unit 405-0 to read output port 406-0, via delay unit 405-1 to read output port 406-1, via delay unit 405-2 to read output port 406-2 and via 405-3 to read output port 406-3, in well known fashion. Delay unit 405-0 supplies three (3) delay interval units, delay unit 405-1 supplies two (2) delay interval units and delay unit 405-2 supplies one (1) delay interval unit. Read output ports 406-0 through 406-3 supply signal elements in parallel to links 109-0 through 109-3, respectively. (In this example, X=12, the rate into read port 401-0 is 8-bits at 77.76 MHz, the rate out of controllable selector 404 is 8-bits at 19.44 MHz and the rate out of each of output ports 406 is 1-bit at 155.52 MHz.) Again, by reducing the number of read ports we can reduce the size of the multi-port memory component. As previously stated, a smaller memory component can maintain a higher read/write rate, or can be made deeper for the same read/write rate.

The above describes embodiments of the application of the principles of the invention. It will be apparent to those skilled in the art how to apply the principles of the invention to other applications without departing from the spirit and scope of the invention.

What is claimed is:

1. A digital cross-connect system having a plurality of input ports, a plurality of output ports and an input/output clock rate comprising:

a plurality of multi-port random access memory (RAM) switch units, each of said plurality of multi-port RAM switch units including one or more separate input ports and one or more separate output ports and a plurality of storage locations for storing signal elements;

a corresponding plurality of slicer units, each of said plurality of slicer units including an input and one or more outputs and being adapted to generate signal slices of a corresponding incoming signal having the input/output clock rate, each of said signal slices including a predetermined number of bits;

a corresponding plurality of write ports units associated on a one-to-one basis with individual ones of said plurality of multi-port RAM switch units, each of said plurality of write ports units includes one or more write input ports and one or more write output ports, each of said write ports units being supplied signal slices from said outputs of one or more of said plurality of slicer units in a prescribed format to prescribed ones of said one or more write input ports at a third clock rate, each of said plurality of write ports supplying signal slices from their respective one or more write output ports at a first clock rate to said associated multi-port RAM switch unit input port and for writing said supplied slices as signal elements to prescribed storage locations of said associated multi-port RAM switch unit at a first clock rate other than said input/output clock rate;

a corresponding plurality of read ports associated on a one-to-one basis with individual ones of said plurality of multi-port RAM switch units, each of said plurality of read ports units having one or more read port inputs and one or more read port outputs and being adapted to controllably read particular ones of said stored signal elements from said associated multi-port RAM switch unit in accordance with a prescribed read address map at a second clock rate other than said input/output clock rate, wherein said signal element outputs from said plurality of read ports units are signal slices; and a corresponding plurality of combiners supplied with said signal slices from said one or more read port outputs of said plurality of read ports units for combining them into corresponding outgoing signals at said input/output clock rate, wherein said first clock rate and said second clock rate are each slower than said input/output clock rate.

2. The invention as defined in claim 1 wherein a multi-port RAM based time/space cross-connect system is realized.

3. The invention as defined in claim 1 wherein said first clock rate is slower than said second clock rate.

4. The invention as defined in claim 1 wherein said first clock rate is at the same rate as said second clock rate.

5. The invention as defined in claim 1 wherein each of said plurality of write ports units includes a plurality of write ports and each of said write ports includes at least one write input port and an associated at least one write circuit, said at least one write input port receiving said signal slices at said third clock rate and supplying said slices as signal elements to said associated at least one write circuit at said first clock rate and said at least one write circuit supplies said signal elements at said first clock rate to an associated input port of said associated multi-port RAM switch unit for storage in prescribed storage locations.

6. The invention as defined in claim 5 wherein each of said plurality of multi-port RAM switch units includes a plurality of input ports and each of said plurality of write port includes a plurality of write input ports and a corresponding number of write circuits, each of said write circuits being associated on a one-to-one basis with said plurality of multi-port RAM switch unit input ports.

7. The invention as defined in claim 5 wherein each of said plurality of multi-port RAM switch units includes a plurality of input ports, and further including a plurality of write ports, each of said write ports including a plurality of write input ports, each of said write input ports supplying signal elements at said first clock rate as an output, a write circuit and a controllable element for supplying said signal element outputs from said plurality of write input ports in a time staggered repetitive sequence to said write circuit, each of said write circuits being associated on a one-to-one basis with said plurality of multi-port RAM switch unit input ports, wherein said first clock rate is slower than said input/output clock rate.

8. The invention as defined in claim 7 wherein each of said plurality of multi-port RAM switch units includes a plurality of output ports, and further including a plurality of read ports, each of said read ports including a read circuit for arbitrarily reading signal elements from storage locations in said multi-port RAM switch unit in accordance with a prescribed read address map, a plurality of read output ports and a controllable element for supplying a plurality of said signal elements from said read circuit in parallel and on a one-to-one basis to said plurality of read output ports at said second clock rate, each of said read circuits being associated on a one-to-one basis with said plurality of multi-port RAM switch unit output ports, wherein the outputs from said read output ports are at said third clock rate and said second clock rate is slower than said input/output clock rate.

9. The invention as defined in claim 5 wherein said signal element outputs from each of said plurality of read ports are signal slices, and further including at least one combiner supplied with said signal slices from said read output ports for combining them into at least one outgoing signal at said third clock rate.

10. The invention as defined in claim 8 wherein said signal element outputs from said read output ports are signal slices, and further including at least one combiner supplied with said signal slices from said plurality of read output ports for combining them into at least one outgoing signal at said third clock rate.

11. The invention as defined in claim 8 further including a plurality of address maps each associated on a one-to-one basis with said plurality of read circuits.

12. The invention as defined in claim 10 further including a plurality of address maps each associated on a one-to-one basis with said plurality of read circuits and each of said address maps includes non-overlapping addresses of a segment of storage elements assigned to said associated one of said plurality of read circuits.

* * * * *